(No Model.)

B. T. PHELPS.
DRESS SQUARE.

No. 279,979.                Patented June 26, 1883.

Witnesses.
S. N. Piper
E. B. Pratt

Inventor:
Brigham Thomas Phelps.
by R. H. Eddy att'y.

UNITED STATES PATENT OFFICE.

BRIGHAM T. PHELPS, OF BELLOWS FALLS, VERMONT.

DRESS-SQUARE.

SPECIFICATION forming part of Letters Patent No. 279,979, dated June 26, 1883.

Application filed January 23, 1883. (No model.)

*To all whom it may concern:*

Be it known that I, BRIGHAM THOMAS PHELPS, of Bellows Falls, in the county of Windham, of the State of Vermont, have invented a new and useful Improvement in Dress-Squares; and I do hereby declare the same to be described in the following specification and represented in the accompanying drawings, of which—

Figure 1:
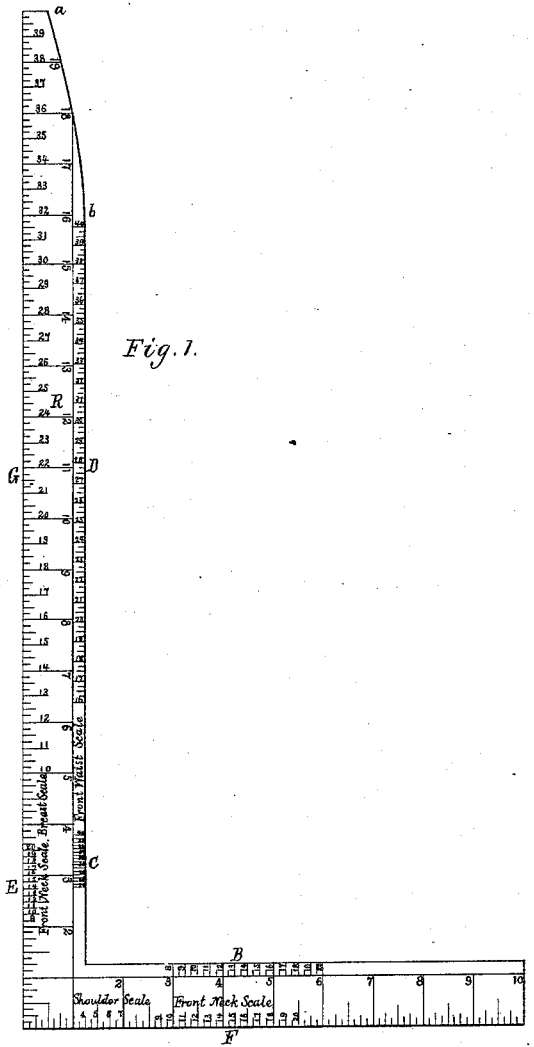
Figure 2:
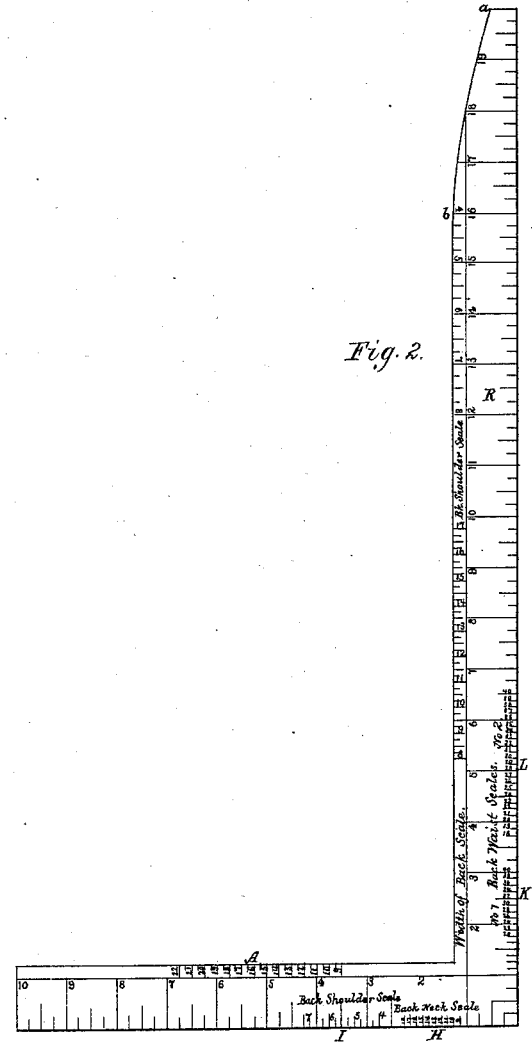

Figure 1 is one side view, and Fig. 2 the other or opposite side view, of a square embodying my improvements.

This square, in its general form, is like the well-known artificer's right-angular square; but instead of making the longer arm R of it of equal width throughout, I for about one-fourth of its length from its end curve it in manner as shown at $a\,b$ in the drawings, such curve rendering the square useful in laying out what are termed by tailors the "biases," and various other curves required in cutting cloth for converting it into a garment.

Besides the ordinary scales of feet and inches and parts of inches of the two arms of the square as formed in the artificer's square, I add to my improved garment or dress square others, as denoted by the letters A, B, C, D, E, F, G, H, I, and K in the drawings, that marked A being to aid in laying off the depth of the garment back at the arm. The scale B is to aid in obtaining the depth of the arm-scye at the armpit of the garment. The scale C is to aid in obtaining the distance of the front bias from the front hem-line at the waist of the garment. The scale D is what may be termed the "front waist scale," and is to aid in obtaining the amount of the biases of the garment. The scales E and F are what are termed the "front neck scales," they being to aid in laying off the width and depth of the neck of the garment. The scale G is for obtaining or laying off various other or general measures. The scale H is to aid in laying off the top of the back of the neck. The scale I is to aid in obtaining the slope of the shoulder, while the scales K and L are what are termed the "back waist scales."

I am aware that a straight rule has been devised for use in making a dress-chart, such rule having various scales on it and one end formed with a rounded edge; also, that squares have been used for making charts; but the latter are simply squares. My device combines the excellencies of the two, and is an article by means of which any kind of dress can be laid out.

What I claim is—

The dress-square having a longer and shorter arm, the former having the convex curve $a\,b$ at its end on the inner side for about one-fourth of its length, the said square being provided with the ordinary scale of feet and inches and the various scales for measuring the different parts of the garment, as set forth.

BRIGHAM THOMAS PHELPS.

Witnesses:
    R. H. EDDY,
    E. B. PRATT.